(12) United States Patent
Seong et al.

(10) Patent No.: US 9,484,804 B2
(45) Date of Patent: Nov. 1, 2016

(54) BATTERY CHARGING SYSTEM AND METHOD

(71) Applicant: Hyundai Motor Company, Seoul (KR)

(72) Inventors: Hyun Wook Seong, Gyeonggi-do (KR);
Mu Shin Kwak, Gyeonggi-do (KR);
Shin Hye Chun, Jeollanam-do (KR);
Hui Sung Jang, Gyeonggi-do (KR)

( * ) Notice: Subject to any disclaimer, the term of this patent is extended or adjusted under 35 U.S.C. 154(b) by 131 days.

(21) Appl. No.: 14/314,935

(22) Filed: Jun. 25, 2014

(65) Prior Publication Data

US 2015/0171740 A1  Jun. 18, 2015

(30) Foreign Application Priority Data

Dec. 18, 2013  (KR) ........................ 10-2013-0158744

(51) Int. Cl.
*H02J 7/00* (2006.01)
*H02J 7/16* (2006.01)
*H02M 1/42* (2007.01)
*H02J 7/02* (2016.01)
*H02M 1/00* (2006.01)

(52) U.S. Cl.
CPC .......... *H02M 1/4208* (2013.01); *H02J 7/0052* (2013.01); *H02J 7/0072* (2013.01); *H02J 7/022* (2013.01); *H02M 1/42* (2013.01); *H02J 2007/0059* (2013.01); *H02M 2001/007* (2013.01); *Y02B 70/12* (2013.01)

(58) Field of Classification Search
CPC ............... H02M 1/4208; H02M 1/42; H02M 2001/007; H02J 7/0052; H02J 7/04; H02J 2007/0059; H02J 7/0072; H02J 7/022; Y02B 70/12
See application file for complete search history.

(56) References Cited

U.S. PATENT DOCUMENTS

| 2011/0038189 A1 | 2/2011 | Whittam et al. |
| 2012/0236612 A1* | 9/2012 | Uno ........................ H02M 1/36 363/126 |
| 2013/0106365 A1* | 5/2013 | Ang ....................... B60L 3/0069 320/138 |

FOREIGN PATENT DOCUMENTS

| DE | 20-2008-001162 U1 | 3/2008 |
| JP | 2009-213202 A | 9/2009 |
| JP | 2010-041891 A | 2/2010 |
| JP | 2011-217566 A | 10/2011 |
| KR | 10-2012-0040739 A | 4/2012 |
| KR | 10-2012-0102308 A | 9/2012 |
| WO | 2010/022959 A1 | 3/2010 |
| WO | 2012/171685 A2 | 12/2012 |

OTHER PUBLICATIONS

Extended European Search Report for European Application No. 14177649, completed Jun. 5, 2015, 8 pages.

* cited by examiner

*Primary Examiner* — Vuthe Siek
(74) *Attorney, Agent, or Firm* — Mintz Levin Cohn Ferris Glovsky and Popeo, P.C.; Peter F. Corless

(57) ABSTRACT

A battery charging system includes a PFC converter which converts an alternating current input voltage which is input from a power supply to a direct current output voltage, a DC-DC converter which changes an output voltage of the PFC converter, a battery which is charged by the DC-DC converter, and a controller which calculates power conversion efficiency based on the input current and the input voltage, a charged voltage of the battery, and a charging current for the battery, and updates the output voltage of the PFC converter according to the power conversion efficiency. A battery charging method includes steps of: calculating power conversion efficiency using the input current and the input voltage from the power supply, and the charging current and the charged voltage of the battery; and updating the output voltage of the PFC converter according to the calculated power conversion efficiency.

18 Claims, 3 Drawing Sheets

BATTERY CHARGING SYSTEM AND METHOD

CROSS-REFERENCE(S) TO RELATED APPLICATION

The present application claims under 35 U.S.C. §119(a) the benefit of Korean Patent Application Number 10-2013-0158744 filed on Dec. 18, 2013, which is incorporated by reference herein in its entirety.

BACKGROUND (a) Technical Field

The present invention relates to a system and method for charging a high voltage battery for a vehicle, and more particularly, to a system and method that can increase fuel efficiency by charging a battery with optimum power conversion efficiency.

(b) Description of the Related Art

In a topology in which an isolated DC-DC converter with a full-bridge or half-bridge structure is used, a maximum duty must be used. An output voltage at a Power Factor Correction (PFC) converter of a slower charger which is mounted on a vehicle is controlled to be maintained at a constant value. However, when a charged voltage of a battery is low, the maximum duty cannot be used in the isolated DC-DC converter. Accordingly, a significant conduction loss occurs due to a freewheeling current. This problem significantly deteriorates the overall efficiency of a slower charger, resulting in an increase in charging time.

In particular, when the output voltage of the PFC converter of a slower charger is controlled to be maintained at a predetermined constant value, a voltage of a battery connected to an output terminal of a DC-DC converter of the slower charger depends on a State of Charge (SOC). Since the voltage of the battery fluctuates within a large range when the battery is charged, if the output voltage of the PFC converter is maintained at a constant value, the efficiency is decreased. The decreased average charging efficiency of the slower charger leads to a decrease in Miles Per Gallon of gasoline equivalent (MPGe) and an increase in charging time.

FIG. 1 (RELATED ART) illustrates a battery charging system according to a conventional art. With reference to FIG. 1, a battery charging system 100 includes an alternating current input power supply 100, a PFC converter 120, a DC-DC converter 130, a high voltage battery 140, and a controller 150. The controller 150 transmits a voltage fixing command to the PFC converter 120 so that the output voltage of the PFC converter 120 can be fixed.

The foregoing is intended merely to aid in the understanding of the background of the present invention, and is not intended to mean that the present invention falls within the purview of the related art that is already known to those skilled in the art.

SUMMARY

Accordingly, the present invention is directed to a system and method for charging a battery which can charge the battery with optimum power conversion efficiency.

According to one aspect, there is provided a battery charging system including a PFC converter which converts an input voltage of an alternating current input from a power supply to an output voltage of a direct current, a DC-DC converter which changes the output voltage of the PFC converter, a battery which is charged by an output current of the DC-DC converter, and a controller which calculates power conversion efficiency based on the input voltage, the input current, a charged voltage of the battery, and a battery charging current, and updates the output voltage of the PFC converter according to the calculated power conversion efficiency with a first period.

The controller may set a lower limit value and an upper limit value of the output voltage of the PFC converter according to the input voltage, with a second period, and the set lower limit value may be higher than a peak value of the input voltage.

The controller can determine whether to change the set upper and lower limit values according to the input voltage, when the updated output voltage of the PFC converter is identical to the output voltage obtained in a previous period.

The controller may set the output voltage of the PFC converter to the changed upper limit value, when the upper limit value and the lower limit value are changed.

The controller may set the output voltage of the PFC converter to the output voltage which is set in the previous period, when the upper limit value and the lower limit value are not changed.

The controller may calculate the power conversion efficiency based on the input voltage and input current obtained when the output voltage of the PFC converter is set to the changed upper limit value and based on the charged voltage of the battery and the battery charging current.

The controller may compare the power conversion efficiency calculated in a current period with the power conversion efficiency calculated in the previous period, and update the output voltage of the PFC converter, with the first period.

According to another aspect, there is provided a battery charging method including steps of: calculating power conversion efficiency with a first period which is preset, using an input current and an input voltage of an alternating current which are input from a power supply and a charging current and a charged voltage of a battery which correspond to the input current and the input voltage, respectively; and updating an output voltage of a PFC converter which converts the input current and the input voltage of the alternating current to the output voltage of a direct current according to the calculated power conversion efficiency.

The battery charging method may further include setting an upper limit value and a lower limit value of the output voltage of the PFC converter according to the input voltage which is input to the PFC converter, with a second period, the setting of the upper limit value and the lower limit value being performed before the calculating of the power conversion efficiency.

The battery charging method may further include determining whether the upper limit and lower limit values which are currently set are changed from the upper limit and lower limit values which are set in a previous period.

The battery charging method may further include setting the output voltage of the PFC converter to the upper limit value, when the upper limit value and the lower limit value are changed.

The updating of the upper limit value and the lower limit value may include setting the output voltage of the PFC converter to the same output voltage used in the previous period when the upper limit value and the lower limit value are not changed.

The calculating of the power conversion efficiency may include calculating the power conversion efficiency using the input voltage and the input current when the output voltage of the PFC converter is set to the upper limit value, and the charged voltage and the charging current of the battery.

The battery charging method may further include comparing the calculated power conversion efficiency calculated in the current period with power conversion efficiency calculated in the previous period.

When the power conversion efficiency calculated in the current period is higher than the power conversion efficiency calculated in the previous period, the updating may include changing the output voltage of the PFC converter, and updating the output voltage of the PFC converter according to a result of a comparison between the changed output voltage and the lower limit value.

The updating may include updating the output voltage of the PFC converter using the changed output voltage of the PFC converter when the changed output voltage is larger than the lower limit value.

The updating may include setting the output voltage of the PFC converter to the same output voltage used in the previous period, when the changed output voltage is smaller than the lower limit value.

The updating may include setting the output voltage of the PFC converter to the same output voltage used in the previous period, when the calculated power conversion efficiency is lower than power conversion efficiency calculated in the previous period.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
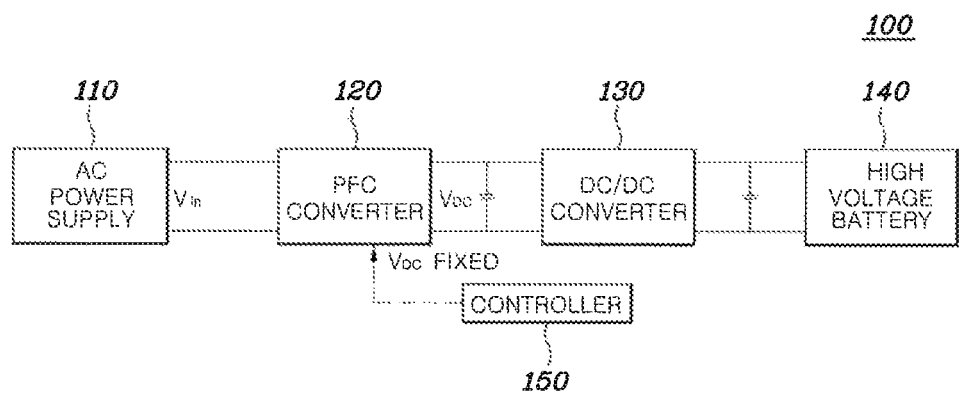
FIG. 1 (RELATED ART) is a schematic diagram illustrating a battery charging system according to a conventional art.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly' indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless otherwise defined, all terms including technical and scientific terms used herein have the same, meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

Figure 2:
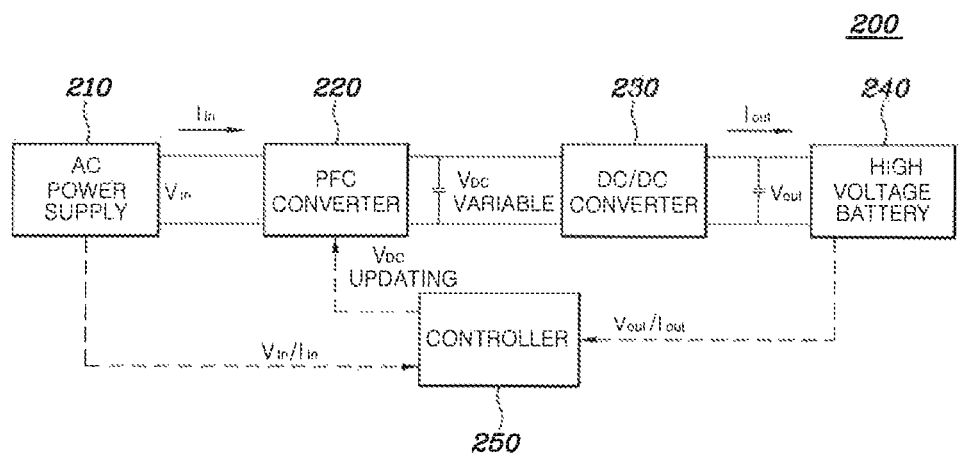
FIG. 2 is a schematic diagram illustrating a battery charging system according to an embodiment of the present invention.

FIG. 2 is a schematic view illustrating a battery charging system according to an embodiment of the present invention. With reference to FIG. 2, a battery charging system 200 includes an alternating current input power supply 210, a PFC converter 220, a DC-DC converter 230, a high voltage battery 240, and a controller 250.

The PFC converter 220 converts an alternating current voltage, which is an input voltage that is input from an alternating current input power supply AC, to a direct current voltage, which is an output voltage and can compensate for power factor. In particular, the PFC converter 220 rectifies the voltage by converting the alternating current voltage to the direct current voltage and increases the power factor by reducing a phase difference between the input current and the input voltage. The output voltage of the PFC converter 220 is determined according to a command issued by the controller 250.

The DC-DC converter 230 is an isolated DC-DC converter with a full-bridge or half-bridge structure. The DC-DC converter 230 can change the output voltage $V_{DC}$ of the PFC converter 220. According to one embodiment, the DC-DC converter 230 transmits a charging current Iout to the high voltage battery 240 so that a charged voltage Vout of the battery 240 can be increased. The output voltage Vout of the DC-DC converter 230 is equal to an open circuit voltage of the high voltage battery 240, which is also equal to the charged voltage Vout of the high voltage battery 240. The output voltage $V_{Dc}$ of the PFC converter 220 also serves as the input voltage of the DC-DC converter 230. The voltage Vout is the charged voltage which indicates the SOC of the high voltage battery 240.

The high voltage battery 240 is charged by the DC-DC converter 230. According to one embodiment, the high voltage battery 240 is charged to about 240 V to 413 V and discharged. When the charged voltage Vout of the high voltage battery 240 is a predetermined value or lower, this condition indicates a state in which it is necessary to perform charging. For example, when the charged voltage Vout of the high voltage battery 240 is about 403 V, this condition indicates a fully-charged state.

The controller 250 can receive values of the charged voltage Vout and the charging current Iout of the high voltage battery 240 detected by a sensing element (not shown), and the input voltage Vin and the input current Iin which are input from the alternating current input power supply 210. The controller 250 can calculate power conversion efficiency $\zeta$ from the input voltage Vin and the input current Iin and the charged voltage Vout and the charging current Iin, and the output voltage $V_{DC}$ of the PFC converter 220 is updated according to the calculated power conversion efficiency $\zeta$, with a first period T1.

The controller 250 can set an upper limit value and a lower limit value of the output voltage $V_{Dc}$ to be output from the PFC converter 220, with a second period T2. The upper limit value is a fixed value, and the lower limit value is a variable value and may be set to be larger than a peak value of the input voltage. Vin which is input from the alternating current input power supply 210. The controller 250 can calculate the power conversion efficiency $\zeta$ within a range between the upper limit value and the lower limit value. In particular, the second period T2 may be longer than the first period T1. The period used for setting the upper limit value and the lower limit value of the output voltage $V_{DC}$ of the PFC converter 220 may be longer than the period used for updating the output voltage $V_{DC}$ of the PFC converter 220.

When the upper limit value and the lower limit value are changed, the controller 250 can set the output voltage $V_{DC}$ of the PFC converter 220 to the changed upper limit value. When the output voltage $V_{DC}$ of the PFC converter 220 is the upper limit value, the controller 250 can receive values of the charged voltage Vout and the charging current Iout of the high voltage battery 240, and the input voltage Vin and the input current Iin which are input from the alternating current input power supply 210. The controller 250 can calculate the power conversion efficiency $\zeta$ using Formula 1, based on the received values, $$\zeta = \frac{Vout \times Iout}{Vinput \times Iinput} \qquad \text{Formula 1}$$

Here, Vinput refers to the input voltage Vin, and Iinput refers to the input current Iin.

The controller 250 can compare the power conversion efficiency $\zeta[k]$ calculated in a current period and the power conversion efficiency $\zeta[k-1]$ calculated in a previous period, and update the output voltage $V_{DC}$ of the PFC converter 220 when the power conversion efficiency $\zeta[k]$ in the current period is higher than the $\zeta[k]$ in the previous period. Specifically, the controller determines whether the changed output voltage $V_{DC}[k+1]$ of the PFC converter is larger than the lower limit value $V_{DC}[k]_{min}$ of the current set output voltage $V_{DC}[k]$ of the PFC converter 220 or not, before issuing a command with respect to the changed output voltage $V_{DC}$ of the PFC converter 220, and may change the output voltage of the PFC converter 220 from $V_{DC}[k]$ to $V_{DC}[k+1]$ when the output voltage $V_{DC}[k+1]$ of the PFC converter 220 is larger than the lower limit value $V_{DC}[k]_{min}$ of the current set output voltage $V_{DC}[k]$ of the PFC converter 220.

In particular, when the power conversion efficiency $\zeta[k]$ which is calculated in the current period is higher than the power conversion efficiency $\zeta[k-1]$ which is calculated in the previous period, the controller 250 can change the output voltage of the PFC converter 220 and update the output voltage of the PFC converter 220 according to a result of a comparison between the changed output value $V_{DC}[k+1]$ and the lower limit value $V_{DC}[k+]_{min}$.

On the other hand, when the changed output voltage $V_{DC}[k+1]$ is smaller than the lower limit value $V_{DC}[k]_{min}$, the controller 250 can set the output voltage of the PFC converter 220 to the same output voltage $V_{DC}[k]$ used in the previous period.

When the power conversion efficiency $\zeta[k]$ calculated in the current period is smaller than the power conversion efficiency $\zeta[k-1]$ calculated in the previous period, the controller 250 can set the output voltage $V_{DC}[k]$ of the PFC converter 220 to the same output voltage $V_{DC}[k]$ of the PFC converter 220 used in the previous period.

When the output voltage of the PFC converter 220 is set to the same output voltage $V_{DC}[k]$ which is used in the previous period, the controller 250 can determine again whether the upper limit value and the lower limit value of the output voltage of the PFC converter 220 is changed or not.

When it is determined that the upper limit value and the lower limit value are changed, the controller 250 sets the output voltage $V_{DC}$ of the converter PFC converter 220 to the changed upper limit value. When the output voltage $V_{DC}$ of the PFC converter 220 is the upper limit value, the controller 250 can receive values of the charged voltage Vout and the charging current Iout of the high voltage battery 240 and the input voltage Vin and the input current Iin which are input from the alternating current input power supply 210. The controller 250 can calculate the power conversion efficiency ζ based on the received values, compare the recalculated power conversion efficiency with the power conversion efficiency calculated in the previous period, and update the output voltage of the PFC converter 220 according to the comparison result.

The controller 250 can set the same output voltage of the PFC converter 220 which is used in the previous period as the output voltage $V_{DC}$ of the PFC converter 220 which is used in the current period, (a) when the preset upper limit value and lower limit value are not changed, (b) when the power conversion efficiency ζ[k] calculated in the current period is identical to the power conversion efficiency ζ[k−1] calculated in the previous period, or (c) when the output voltage $V_{DC}$ of the PFC converter 220 is smaller than the lower limit value. In any one of these cases, the controller 250 can determine again whether the upper limit value and the lower limit value of the output voltage of the PFC converter 220 are changed or not.

In particular, the controller 250 can improve fuel efficiency and shorten a charging time by calculating the power conversion efficiency, with a first period, and compares the current calculated power conversion efficiency with the previously calculated power conversion efficiency, and by updating the output voltage of the PFC converter 220 so that the maximum power conversion efficiency can be obtained.

Figure 3:
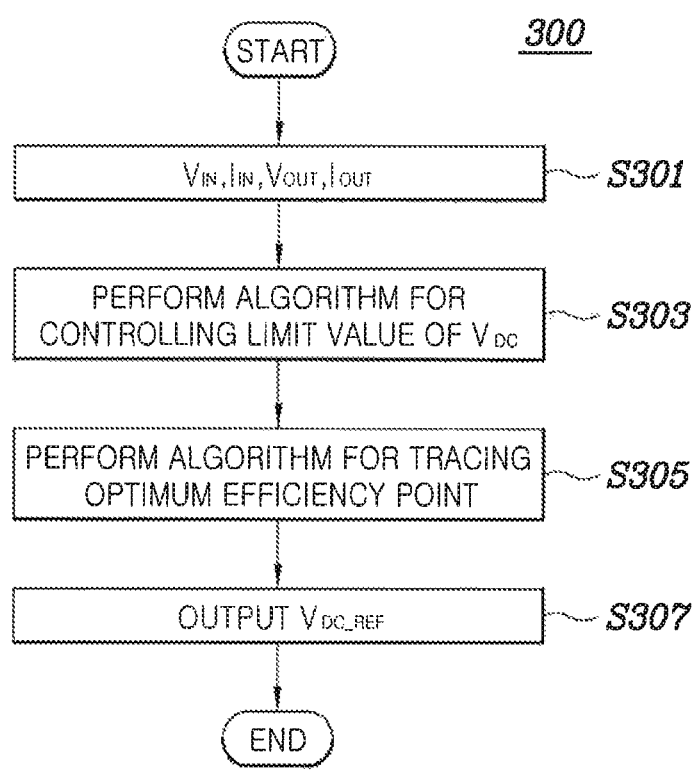
FIGS. 3 and 4 are flowcharts illustrating a battery charging method according to an embodiment of the present invention.
Figure 4:
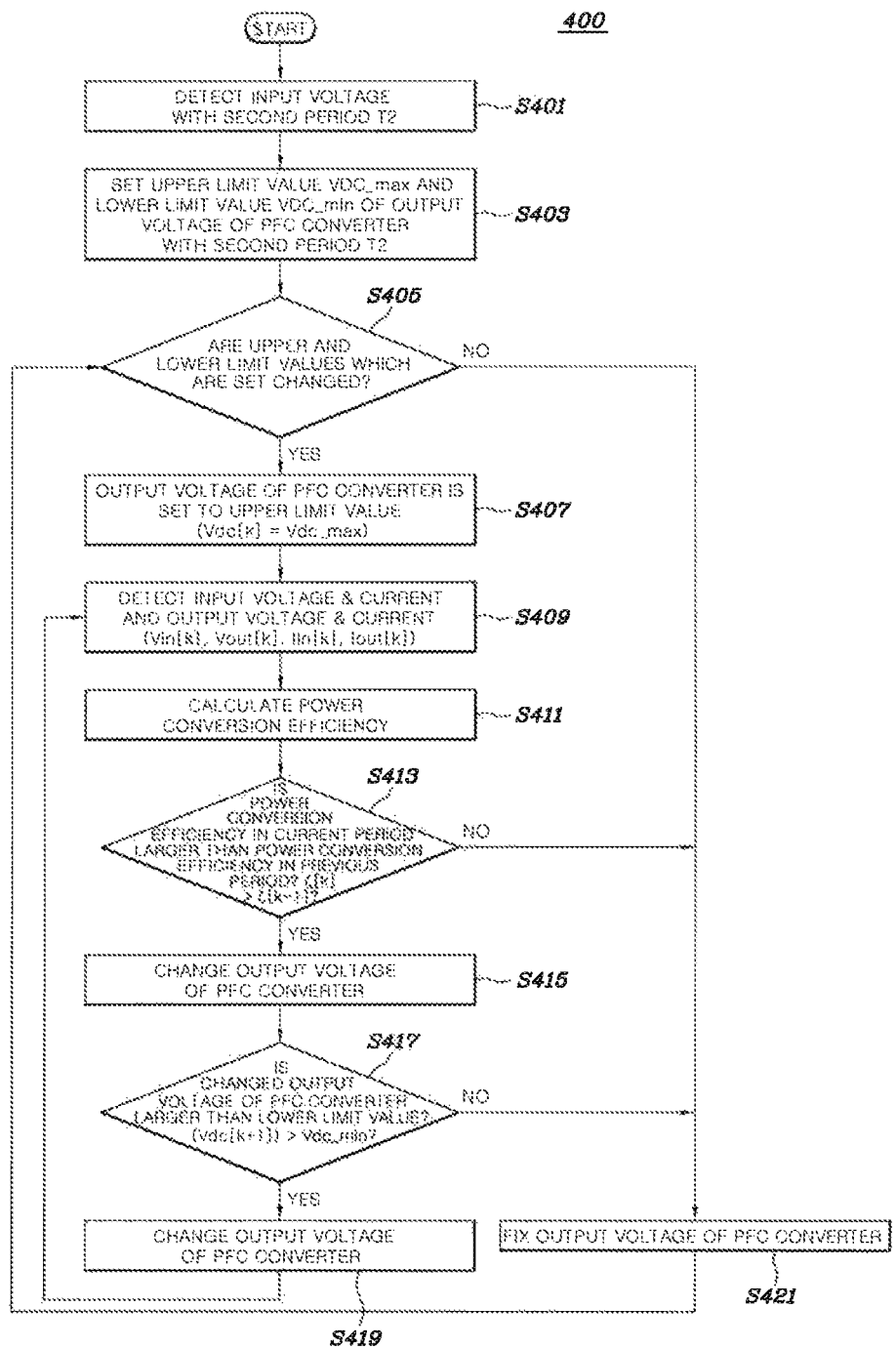

FIGS. 3 and 4 are flowcharts illustrating a battery charging method according to an embodiment of the present invention. With reference to FIGS. 2 to 4, first, values of an input current, an alternating current input voltage, a direct current output voltage, and an output current detected by sensors are transferred to a controller 250 in Step S301. An upper limit value $V_{DC\_max}$ and a lower limit value $V_{DC\_min}$ of an output voltage of a PFC converter 220 are set using the detected alternating current input voltage in Step S303. The upper limit value is a fixed value, and the lower limit value is a value larger than a peak value of the detected alternating current input voltage Vin.

Next, a control algorithm for tracing a time point of optimum power conversion efficiency is performed in Step S305. Step S305 is the same as Step S405 and Step S421 described below. The output voltage $V_{DC}$ of the PFC converter 220 is set according to the traced optimum power conversion efficiency in Step S307.

With reference to FIG. 4, the controller 250 detects an input voltage of an alternating current in Step S401. The controller 250 sets an upper limit value ($V_{DC\_max}$) and a lower limit value ($V_{DC\_min}$) of the output voltage ($V_{DC}$) of the PFC converter 220 using the detected input voltage in Step S403. Step S401 and Step S403 are performed with a second period T2. In particular, Step S401 and Step S403 may be performed with an interval of time T2 therebetween.

The controller 250 can determine whether the upper limit value and the lower limit value in a current period are changed from the upper limit value and the lower limit value which are set in a previous period in Step S405. When the upper limit value and the lower limit value are set for the first time, i.e., in the first period, steps will be subsequently performed when the upper limit value and the lower limit value are changed.

The controller 250 sets the output voltage of the PFC converter 220 to the changed upper limit value when the upper limit value and the lower limit value are changed in Step S407. In Step S409, the controller can receive values of the charged voltage Vout and the charging current Iout of the battery 240, and the input voltage Vin and the input current Iin which are input from an alternating current input power supply 210 when the output voltage of the PFC converter 220 is the upper limit value. The controller 250 can calculate power conversion efficiency ζ[k] based on the received values in Step S411, compare the recalculated power conversion efficiency ζ[k] with power conversion efficiency ζ[k−1] calculated in the previous period, and can update the output voltage of the PFC converter 220 according to a comparison result, with a first period.

When the current calculated power conversion efficiency ζ[k] is higher than the previous power conversion efficiency ζ[k−1], the controller 250 can change the output voltage of the PFC converter 220 in Step S415, compare the changed output voltage with the lower limit value, which is set in Step S403, in Step S417, and update the output voltage of the PFC converter 220 according to the comparison result.

In Step S419, the controller 250 can update the output voltage of the PFC converter 220 using the output voltage which is changed when the output voltage is larger than the set lower limit value. Conversely, when the output voltage is smaller than the set lower limit value, the controller 250 can set the output voltage of the PFC converter 220 to the same output voltage used in the previous period. Updating or setting of the output voltage of the PFC converter 220 refers to an operation in which the controller 250 determines the output voltage of the PFC converter 220 and issues a command to the PFC converter 220 so that the determined output voltage is output from the PFC converter 220.

In Step S421, the current output voltage of the PFC converter is set to the same output voltage used in the previous period, when the set upper and lower limit values are not changed or when the current calculated power conversion efficiency ζ[k] is smaller than the power conversion efficiency ζ[k−1] calculated in the previous period.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A battery charging system comprising:
   a PFC converter which converts an input voltage of an alternating current which is input from a power supply to an output voltage of a direct current;
   a DC-DC converter which changes the output voltage of the PFC converter;
   a battery which is charged by the DC-DC converter; and
   a controller configured to receive an input current and the input voltage which are input from the power supply and a charged voltage and a charging current of the battery and calculate power conversion efficiency, based on a ratio of the charged voltage and the charging current to the input current and the input voltage to adjust the output voltage of the PFC converter according to the calculated power conversion efficiency.

2. The battery charging system according to claim 1, wherein the controller adjusts the output voltage of the PFC converter with a first period and sets an upper limit value and a lower limit value of the output voltage of the PFC converter according to the input voltage, with a second period, and the set lower limit value is larger than a peak value of the input voltage.

3. The battery charging system according to claim 2, wherein the controller determines whether to change the upper limit value and the lower limit value which are set, according to the input voltage, when the adjusted output voltage of the PFC converter is the same as an output voltage used in a previous period.

4. The battery charging system according to claim 3, wherein the controller sets the output voltage of the PFC converter to the changed upper limit value, when the upper limit value and the lower limit value are changed.

5. The battery charging system according to claim 3, wherein the controller sets the output voltage of the PFC converter to the same output voltage used in the previous period, when the upper limit value and the lower limit value are not changed.

6. The battery charging system according to claim 4, wherein the controller calculates the power conversion efficiency using the input voltage and the input current obtained when the output voltage of the PFC converter is set to the changed upper limit value, and the charged voltage and the charging current of the battery.

7. The battery charging system according to claim 2, wherein the controller calculates the power conversion efficiency with the first period, compares the power conversion efficiency calculated currently with the power conversion efficiency calculated previously, and adjusts the output voltage of the PFC converter based on the comparison result with the first period.

8. A battery charging method which applies to a battery charging system comprising a PFC converter which converts an input voltage of an alternating current which is input from a power supply to an output voltage of a direct current, a DC-DC converter which changes the output voltage of the PFC converter, a battery which is charged by the DC-DC converter, comprising steps of:
  receiving, by the controller, an input current and the input voltage which are input from the power supply and a charged voltage and a charging current of the battery;
  calculating, by a controller, power conversion efficiency based on a ratio of the charged voltage and the charging current to the input current and the input voltage; and
  adjusting, by the controller, an output voltage of a PFC converter which converts the input current and the input voltage of the alternating current to the output voltage of a direct current according to the calculated power conversion efficiency.

9. The battery charging method according to claim 8, further comprising a step of:
  setting an upper limit value and a lower limit value of the output voltage of the PFC converter according to the input voltage which is input to the PFC converter, with a second period, the setting of the upper limit value and the lower limit value being performed before the step of calculating the power conversion efficiency.

10. The battery charging method according to claim 9, further comprising a step of:
  determining whether the upper and lower limit values which are set in a current period are changed from the upper and lower limit values which are set in a previous period.

11. The battery charging method according to claim 10, further comprising a step of:
  setting the output voltage of the PFC converter to the upper limit value when the upper limit value and the lower limit value are changed.

12. The battery charging method according to claim 10, wherein in the step of adjusting the upper limit value and the lower limit value, the output voltage of the PFC converter is set to the same output voltage used in the previous period when the upper limit value and the lower limit value are not changed.

13. The battery charging method according to claim 9, wherein the step of calculating the power conversion efficiency includes calculating the power conversion efficiency using the input voltage and the input current which are input when the output voltage of the PFC converter is set to the upper limit value, and the charged voltage and the charging current of the battery.

14. The battery charging method according to claim 13, further comprising a step of:
  comparing the calculated power conversion efficiency with a power conversion efficiency calculated in a previous period.

15. The battery charging method according to claim 14, wherein when the calculated power conversion efficiency is higher than the power conversion efficiency calculated in the previous period, the step of adjusting the output voltage includes changing the output voltage of the PFC converter and adjusting the output voltage of the PFC converter according to a result of a comparison between the changed output voltage and the lower limit value.

16. The battery charging method according to claim 15, wherein the step of adjusting the output voltage includes adjusting the output voltage of the PFC converter using the output voltage of the PFC converter which is changed when the changed output voltage is larger than the lower limit value.

17. The battery charging method according to claim 15, wherein the step of adjusting the output voltage includes setting the output voltage of the PFC converter to the same output voltage used in the previous period, when the changed output voltage is smaller than the lower limit value.

18. The battery charging method according to claim 14, wherein the step of adjusting the output voltage includes setting the output voltage of the PFC converter to the same output voltage used in the previous period, when the calculated power conversion efficiency is lower than power conversion efficiency calculated in the previous period.

* * * * *